United States Patent
Ucan et al.

(10) Patent No.: US 12,066,352 B2
(45) Date of Patent: Aug. 20, 2024

(54) METHOD AND APPARATUS FOR DETECTING A LEAKAGE OF A VACUUM ASSEMBLY

(71) Applicants: DEUTSCHES ZENTRUM FÜR LUFT—UND RAUMFAHRT E.V., Cologne (DE); AIRBUS OPERATIONS GMBH, Hamburg (DE)

(72) Inventors: Hakan Ucan, Stade (DE); Anja Haschenburger, Stade (DE); Clemens Heim, Stade (DE); Jan Timo Hesse, Olendorf (DE)

(73) Assignees: DEUTSCHES ZENTRUM FUER LUFT—UND RAUMFAHRT, Cologne (DE); AIRBUS OPERATIONS GMBH, Hamburg (DE)

( * ) Notice: Subject to any disclaimer, the term of this patent is extended or adjusted under 35 U.S.C. 154(b) by 988 days.

(21) Appl. No.: 16/644,064

(22) PCT Filed: Sep. 3, 2018

(86) PCT No.: PCT/EP2018/073626
§ 371 (c)(1),
(2) Date: Mar. 11, 2021

(87) PCT Pub. No.: WO2019/043227
PCT Pub. Date: Mar. 7, 2019

(65) Prior Publication Data
US 2021/0215565 A1      Jul. 15, 2021

(30) Foreign Application Priority Data

Sep. 4, 2017   (DE) .................... 10 2017 120 272.2

(51) Int. Cl.
*G01M 3/00* (2006.01)
*B29C 70/44* (2006.01)
(Continued)

(52) U.S. Cl.
CPC .......... *G01M 3/002* (2013.01); *B29C 70/443* (2013.01); *B29C 70/54* (2013.01); *G01M 3/24* (2013.01)

(58) Field of Classification Search
None
See application file for complete search history.

(56) References Cited

U.S. PATENT DOCUMENTS

| 8,955,370 B1 * | 2/2015 | Thornberg | G01M 3/3263 |
| | | | 73/49.3 |
| 9,404,828 B2 * | 8/2016 | Yamaguchi | G01M 3/02 |

(Continued)

FOREIGN PATENT DOCUMENTS

| DE | 102011100096 B4 * | 10/2014 | G01M 3/002 |
| WO | 2017/032741 A1 | 3/2017 | |
| WO | WO-2017032741 A1 * | 3/2017 | G01M 3/187 |

*Primary Examiner* — Peter J Macchiarolo
*Assistant Examiner* — Jermaine L Jenkins
(74) *Attorney, Agent, or Firm* — WC&F IP

(57) ABSTRACT

The present invention comprises a method for detecting a leak in a vacuum assembly comprising the steps:
implementation of a first detection process to identify a leak area, involving
the supply of a vacuum assembly which has a plurality of sensors for detecting a parameter,
the determination of values of the parameter over time during the evacuation of a cavity of the vacuum assembly,
the creation of a value-time curve for each sensor of the vacuum assembly from the values detected for the respective sensors by means of an evaluation unit,
the comparison of the value-time curves created with one another and identification of differences depending on the comparison by means of the evaluation unit, and
the identification of a leak area in the vacuum assembly depending on the differences determined in the value-time curves and the respective position of the sensor in relation to the vacuum assembly; and
implementation of a second detection process following the first detection process to detect the leak within the leak area identified, involving
the supply of an additional detection device which is designed to identify a leak in a vacuum assembly, and
the detection of a leak within the leak area by means of the detection device.

9 Claims, 1 Drawing Sheet

(51) Int. Cl.
*B29C 70/54* (2006.01)
*G01M 3/24* (2006.01)

(56) References Cited

U.S. PATENT DOCUMENTS

| | | |
|---|---|---|
| 2009/0273107 A1 | 11/2009 | Advani et al. |
| 2013/0330832 A1 | 12/2013 | Hauke et al. |
| 2014/0061962 A1 | 3/2014 | David et al. |
| 2016/0349139 A1 | 12/2016 | Gerogina et al. |

* cited by examiner

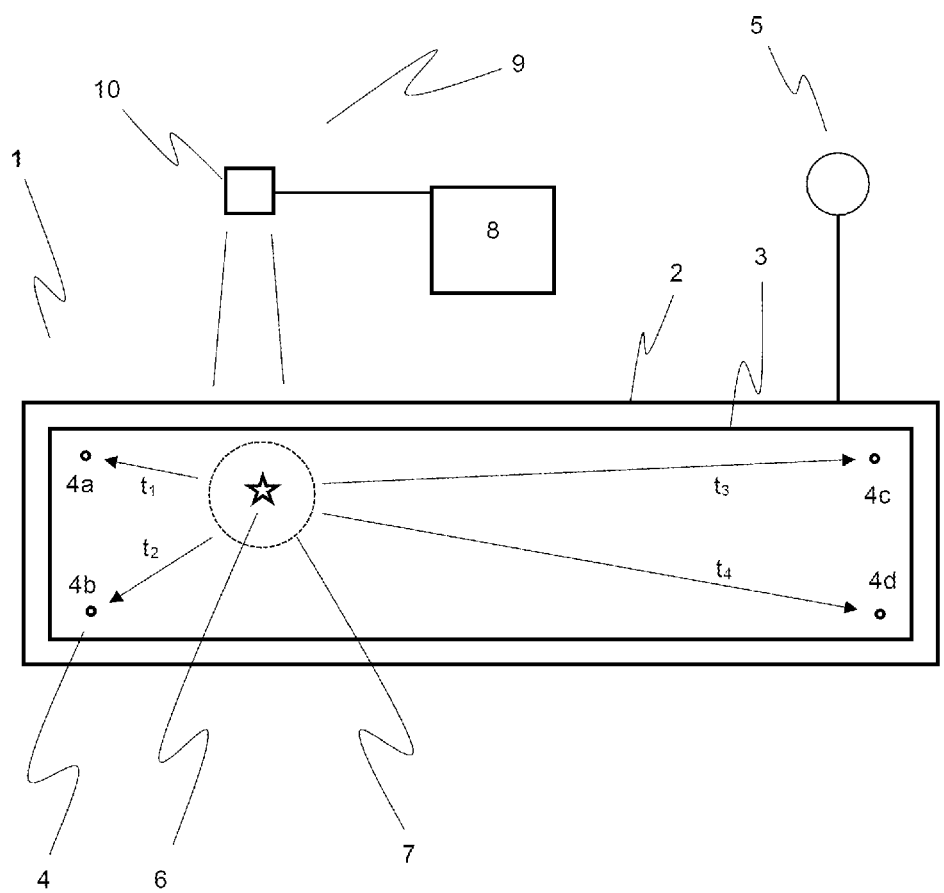

METHOD AND APPARATUS FOR DETECTING A LEAKAGE OF A VACUUM ASSEMBLY

The invention relates to a method for detecting a leak in a vacuum assembly, in particular for producing a fiber composite component from a fiber material and a matrix material. The invention also relates to a method for producing a fiber composite component having a leak detection of this kind, and to a device for producing a fiber composite component.

The weight-specific strength and rigidity of fiber composite components which are produced from a fiber composite material make them particularly suitable in the area of lightweight construction and they have become an essential part of aviation and space travel and the automobile industry as a result. In this case, fiber composite materials have as their main constituent a fiber material and a matrix material which impregnates the fiber material and, after curing, forms an integral unit with the fiber material. This means that the fiber material is forced in its predetermined direction for the purpose of load transfer.

A widespread production process for this is vacuum infiltration, in which the fiber material is usually deposited on a mold and sealed in a vacuum-tight manner by means of a vacuum assembly. The fiber material sealed in a vacuum-tight manner is then evacuated, so that due to the pressure gradient between the fiber material and the outside environment, the matrix material can infiltrate the fiber material. The matrix material can then be cured in an autoclave, for example, and the component is thereby produced.

But a vacuum assembly is also relevant when producing fiber composite components by means of prepregs, since a vacuum-tight structure is necessary for autoclave curing too, so that a uniform pressure transfer to the component is guaranteed.

A vacuum assembly of this kind is usually made up of a vacuum cover, for example a vacuum film or a vacuum hood, which is usually bonded to the mold with the help of a corresponding adhesive (sealing kit) and sealed in an airtight manner.

If there is a leak in the vacuum assembly during the process, it can be expected that the component quality will be severely compromised or the component may even be scrapped. This kind of damage results in high costs and a delay in the sequence of operations.

In this case, methods for detecting leaks in which, for example, a leak is inferred by means of a negative-pressure measurement are known in the art. If the applied pressure difference changes once the vacuum is set, it must be assumed that there is a leak. Scanning the assembly with the help of an acoustic leak device is also known in the art.

However, the methods have the disadvantage that they are entirely unsuitable for large components such as rotor blades for wind turbines or wing shells for aircraft, for example, as they either only determine whether there is a leak present, but not where said leak is located, or because they are simply too tedious to use and only prolong the process sequence unnecessarily.

A method for detecting a leak in a vacuum-sealed assembly is known from DE 10 2011 100 096 B4, for example, in which a temperature difference on a vacuum-sealed assembly is determined with the help of a thermographic image sensor and a leak is then detected, since the ambient air flowing into the fiber material on account of the leak produces a temperature difference within the vacuum assembly. However, this method is not suitable for large-area components either, since it is not possible to inspect the entire surface in an operationally reliable manner with the help of the thermographic image sensor and it therefore has to be scanned in a time-consuming manner.

An object of the present invention is therefore to provide an improved method and a corresponding device with which a leak in a vacuum assembly can be detected quickly and reliably, even in the case of very large components.

The object is achieved according to the invention by the method as claimed in claim 1.

Consequently, a two-stage detection process is proposed, wherein in the first detection process a general leak area within which the leak is suspected is determined to begin with, while in a second detection process this leak area is then investigated more closely and located, i.e. the position is determined.

For the first detection process, a vacuum assembly is supplied in this case which has a plurality of sensors for detecting a parameter. These sensors may be integrated in the vacuum cover or also in the mold in this case. A vacuum assembly within the meaning of the present invention is understood to mean in this case that through a corresponding enclosure an inner cavity is produced which can be evacuated with the help of a pressure sink. During the production of a fiber composite component, in this case a vacuum assembly of this kind can be created from a forming mold surface of a mold and the vacuum film applied thereto and also the other components for sealing the vacuum assembly. A parameter of this kind may be a physical parameter, for example.

Corresponding values of the parameter are then determined by each sensor over time during the evacuation of the cavity of the vacuum assembly, so that at the end of a certain time period there is a plurality of parameter values for each sensor. A value-time curve is then created from these values for each sensor which indicates the value development of the parameter for each sensor during the evacuation of the cavity. These created value-time curves are compared with one another, wherein during this comparison of the value-time curves of the individual sensors, differences can be determined when a leak manifests itself within the vacuum assembly. Based on these differences among the value-time curves, a leak area can then be identified in the vacuum assembly within which the leak is suspected. The leak area in this case can be accurately demarcated in such a manner that it can be investigated quickly and reliably with the help of a further detection process. However, it is not so accurate that it is sufficient in terms of time for an investigation by hand or a manual investigation.

In the second detection process, the leak area determined in the first detection process is analyzed with the help of an additional detection device and the leak is then detected within the leak area, i.e. the position thereof is determined in relation to a reference coordinate system or reference point. A detection device of this kind may, for example, be the system disclosed in DE 10 2011 100 096 B4 for the detection of leaks with the help of thermography.

The inventors have recognized that a leak area within which the leak exists can be identified with the help of the first detection process, so that this leak area can then be identified and located quickly and efficiently with the help of a detection device in a second detection process, so that in this way large components such as rotor blades for wind turbines or wing shells or fuselage shells of aircraft, in particular, which frequently have dimensions of more than 100 m can be investigated.

The detection device for the second detection process may, in this case, particularly contain a thermographic camera and also an evaluation unit, wherein the leak area is then recorded with the help of the thermographic camera and the image data are then analyzed with the help of the evaluation unit, wherein the leak is then detected based on temperature differences in the image data. In addition, it is conceivable for the vacuum assembly and/or the ambient air to be additionally temperature-controlled, so that any temperature differences based on a leak in the vacuum assembly can be more effectively highlighted. Full reference is made to the contents of DE 10 2011 100 096 B4 in this respect.

The parameter to be determined in this case may be the sound, force or flow rate of the matrix material, for example. Hence, it is conceivable for multiple sound sensors to be distributed in the vacuum assembly at different positions over the entire vacuum assembly, which sound sensors simultaneously detect corresponding values, starting with the evacuation, and transmit these to an evaluation unit. If there is now a leak within the vacuum assembly, this can be detected by a correspondingly characteristic value-time curve of the sound signal, since the amplitude of the sound signal changes. If the individual sound signal curves of the sensors are compared with one another, the approximate position within the vacuum assembly can be detected with the help of the phase deviation of the signal and the leak area can therefore be determined.

The same also applies to the force parameter which means, for example, the force acting on the vacuum assembly which likewise changes characteristically over time during the evacuation when a leak occurs and with which the leak area can likewise be determined with the help of a phase deviation of the individual force signal curves for the leak area.

Hence, it is advantageous, for example, for the individual value-time curves to be standardized in terms of their curve, so that the phase difference of the time-dependent signal can be determined.

It is advantageous in this case if, in particular, the amplitude and/or the time for determining the differences are compared. It is moreover advantageous in this case for a value-time curve to be defined as the reference curve, with which the remaining value-time curves are then compared, and the differences established.

In a further advantageous embodiment, the additional detection device is supplied in such a manner that it has a detection area within which the detection device for detecting a leak is configured, wherein the detection device is oriented in such a manner that the detection area lies at least partially within the leak area.

Depending on the size of the leak area, it is conceivable in this case for the detection device to be moved in such a manner that the detection area of the detection device is moved within the leak area.

The object is further also achieved with the method for producing a fiber composite component as claimed in claim 8 and also with a device for producing a fiber composite component as claimed in claim 9, wherein both the method and the device perform a leak detection with the help of the method described above during production of the fiber composite component.

The invention is explained with the help of the attached FIGURE. In the drawing:

FIG. 1 shows a schematic representation of the method according to the invention during the production of a fiber composite component.

FIG. 1 shows in a highly simplified schematic form the working principle of the present invention. In this case, a vacuum assembly 1 is initially supplied which has a mold 2 and a cover 3. Multiple sound sensors 4 are integrated in the mold 2 of the vacuum assembly 1 in this case which are designed to detect a sound signal within the vacuum assembly 1.

With the help of a pressure sink 5 connected to the vacuum assembly 1, the cavity within the vacuum assembly 1 is evacuated, so that a pressure difference between the ambient air and the inside of the vacuum assembly 1 can be produced. In the exemplary embodiment in FIG. 1, a leak 6 is located within the vacuum assembly in this case through which ambient air is drawn with the help of the pressure sink 5 during the evacuation of the vacuum assembly 1.

On account of the leak 6, a sound signal is generated during the evacuation of the vacuum assembly 1 and the incoming flow of outside air through the leak 6, which sound signal is received by the four sound sensors $4a$ to $4d$. The sound signal in this case is received based on the position of the leak 6 in relation to the vacuum assembly 1 at different times $t_1$ to $t_4$ in each case, which can be determined by a comparison of the sound signal curves of each individual sensor $4a$ to $4d$. Hence, the sound signal of the leak 6 in relation to the sound sensor $4a$ needs the time span $t_1$, while the second sound sensor $4b$ receives the sound signal according to $t_2$. The same applies to the third sensor $4c$ and the fourth sensor $4d$.

On account of the signal curves, a phase displacement and therefore differences in the run time of the sound signal generated on account of the leak 6 can be ascertained, wherein based on these run time differences, a leak area 7 can then be detected, within which the leak 6 is suspected. The calculation of the leak area 7 based on the signal curves of the sensors $4a$ to $4d$ may take place in this case with the help of an evaluating unit 8 which is connected to the sensors $4a$ to $4d$. It is conceivable in this case for the evaluation unit 8 likewise to be connected to the pressure sink 5 or to the control system thereof, so that the values determined by the sensors can be standardized accordingly at the start of the evacuation by the pressure sink 5.

Once the leak area 7 has been identified with the help of the sound sensors 4, the leak area 7 is then investigated with the help of a further detection device 9. The detection device 9 in the exemplary embodiment in FIG. 1 is a device for implementing a thermographic method in which the leak area 7 is recorded with the help of a thermographic camera 10. The position of the leak can then be located very precisely and detected with positional accuracy from the temperature differences that can be identified in the leak area 7, so that particularly in the case of large-size components, the leak 6 can be located within the shortest possible time.

In this case, the sound signal changes in the presence of a leak 6 in a correspondingly characteristic manner, so that this is immediately identifiable within the signal curve. This is because without a leak 6 at most the sound in relation to the pressure sink 5 could be detected, while with the leak 6 by the incoming flow of additional air, a corresponding characteristic sound signal is formed. This kind of characteristic deviation from the sound signal without a leak is, for example, the non-linearity or the deviation from the linear curve of the sound signal without a leak.

REFERENCE NUMBERS

1 Vacuum assembly
2 Mold

3 Vacuum cover
4 Sound sensors
5 Pressure sink
6 Leak
7 Leak area
8 Evaluation unit
9 Detection device
10 Thermographic camera

The invention claimed is:

1. A method for detecting a leak in a vacuum assembly, comprising:
   identifying a leak area, comprising
       supplying a vacuum assembly which has a plurality of sensors for detecting a parameter,
       detecting values of the parameter over time during evacuation of a cavity of the vacuum assembly,
       creating, with an evaluation unit, a value-time curve for each sensor of the vacuum assembly from the values detected for the respective sensors,
       comparing, with the evaluation unit, the value-time curves created with one another and identifying differences depending on the comparison, and
       identifying the leak area in the vacuum assembly depending on the differences determined in the value-time curves and the respective position of the sensor in the vacuum assembly; and then
   detecting the leak within the leak area, comprising
       supplying a detection device designed to identify the leak in the vacuum assembly, and
       detecting the leak within the leak area using the detection device.

2. The method as claimed in claim 1, wherein the detection device has a detection area within which the detection device is configured, wherein the detection device is oriented such that the detection area lies at least partially within the leak area.

3. The method as claimed in claim 2, further comprising moving the detection area within the leak area.

4. The method as claimed in claim 1, wherein the detection device is configured to detect the leak by thermography.

5. The method as claimed in claim 1 wherein the parameter is a physical parameter selected from the group consisting of sound, force, and flow rate.

6. The method as claimed in claim 1, wherein the value-time curves created are standardized in terms of their characteristic curve and thereby compared to determine differences.

7. The method as claimed in claim 6, wherein the value-time curves are compared in terms of amplitude and/or time, wherein depending on differences in terms of amplitude and/or time, the leak area is then determined.

8. A method for producing a fiber composite component from a fiber material and a matrix material, comprising: introducing the fiber material into a cavity of a vacuum assembly, infiltrating the fiber material with the matrix material, curing the matrix material evacuating the cavity of the vacuum assembly, and detecting a leak in the vacuum assembly according to claim 1.

9. A device for producing a fiber composite component from a fiber material and a matrix material, wherein the fiber material is introduced into the cavity of the vacuum assembly, infiltrated with the matrix material and cured, wherein the device is designed to implement the method as claimed in claim 1.

* * * * *